Dec. 11, 1934. G. W. LYONS 1,984,027
BAKING APPARATUS
Filed Feb. 15, 1933 3 Sheets-Sheet 2
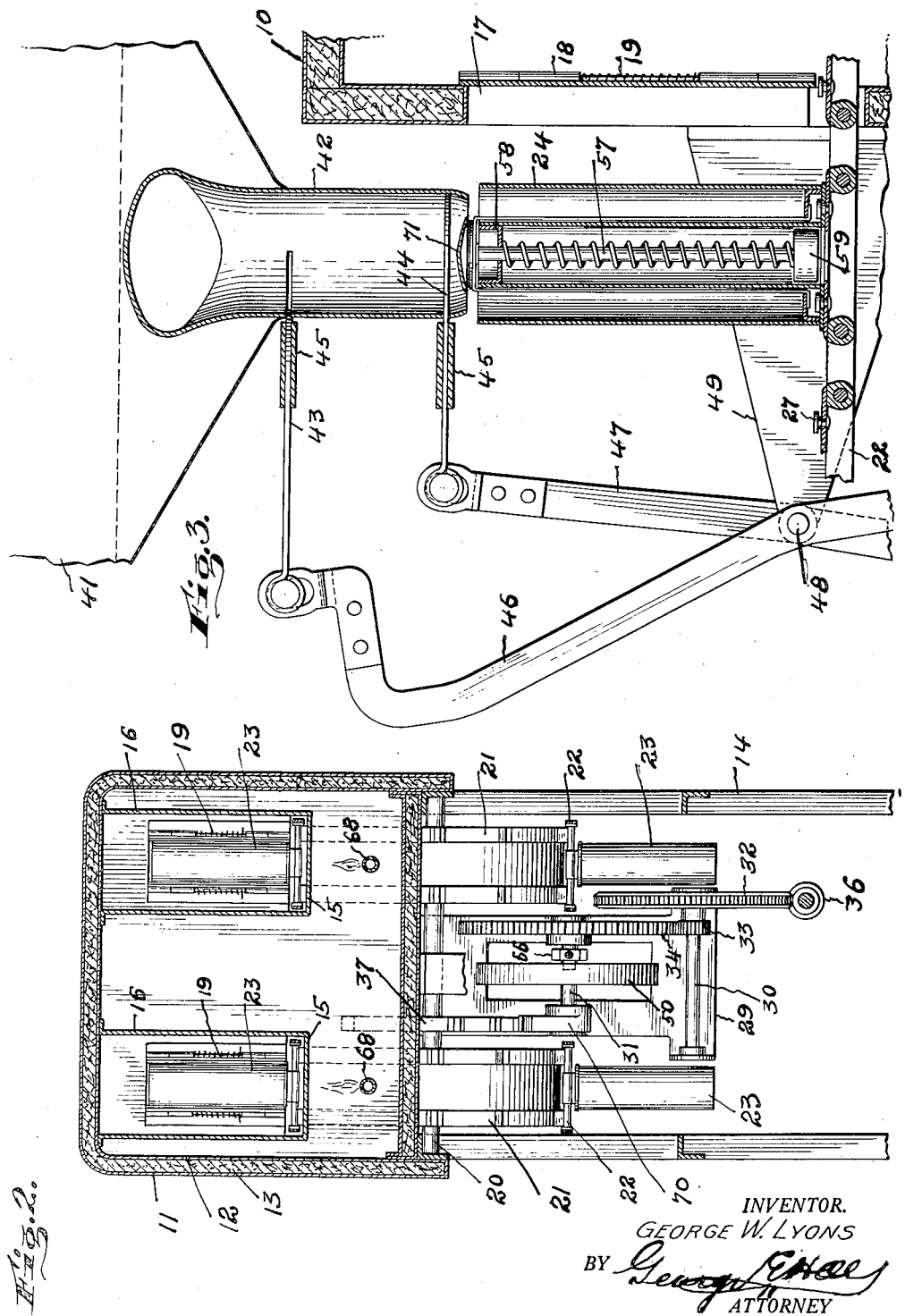
INVENTOR.
GEORGE W. LYONS
BY George T. Hall
ATTORNEY

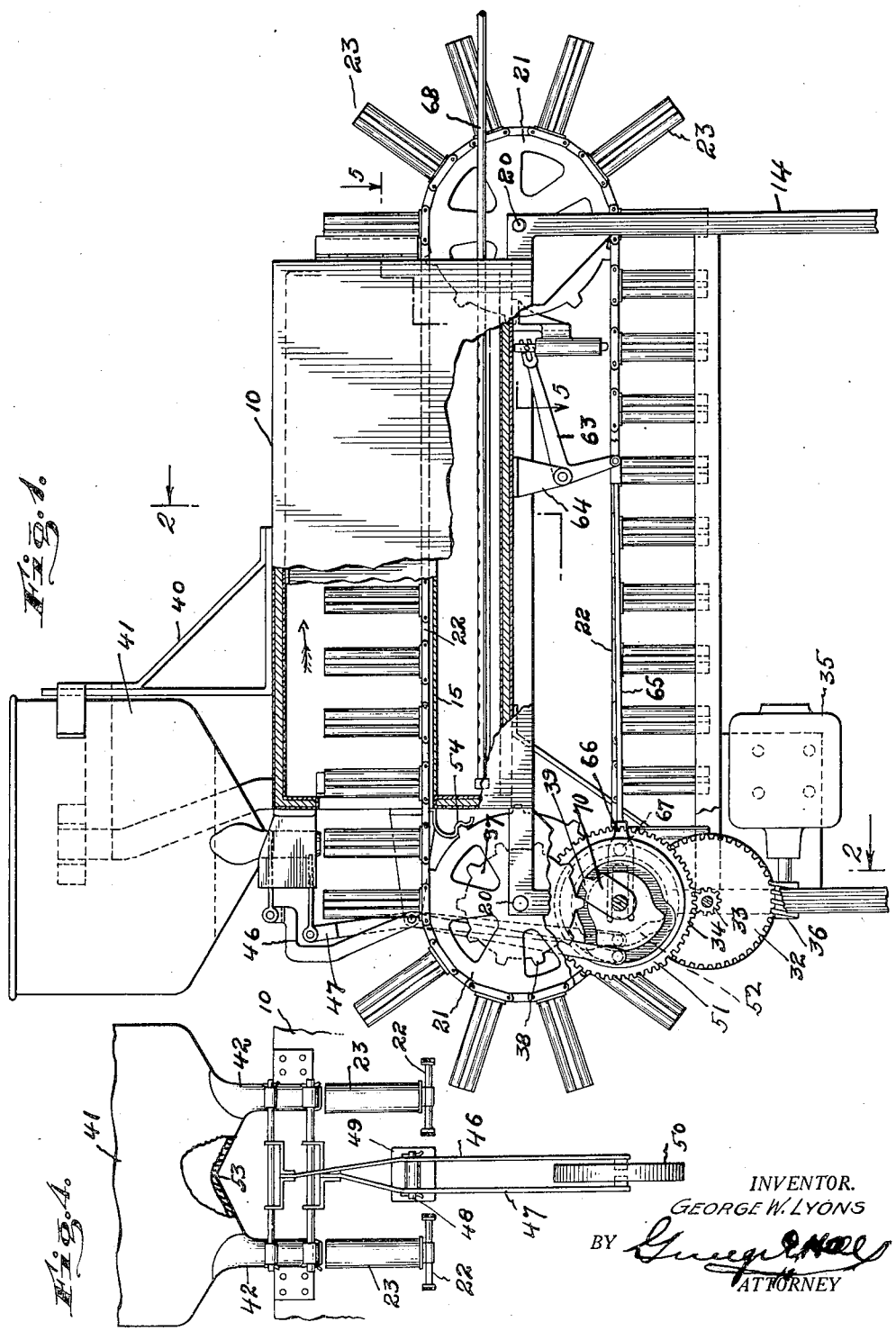

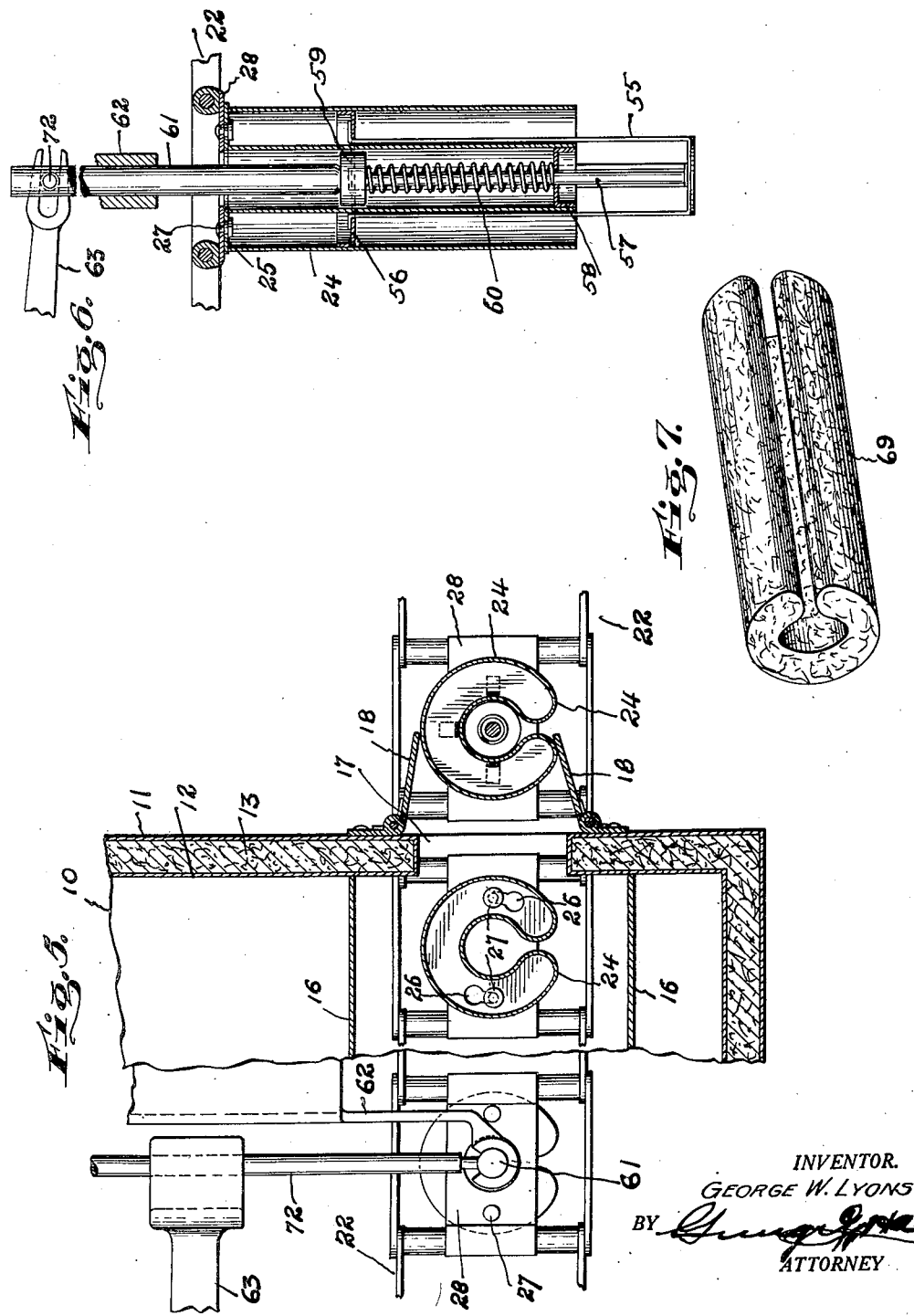

Patented Dec. 11, 1934

1,984,027

UNITED STATES PATENT OFFICE 1,984,027

BAKING APPARATUS

George W. Lyons, Hamden, Conn., assignor to The General Mechanical Company, New Haven, Conn., a corporation of Connecticut Application February 15, 1933, Serial No. 656,830

3 Claims. (Cl. 107—58)

My invention relates to a new and improved baking apparatus.

It is the object of this invention, among other things, to provide a mechanism whereby articles of predetermined size and shape may be made from a batch of batter, passed through an oven to be baked, and thereafter discharged ready for use, all of the operations being automatic and at no time during the process is the human hand in contact with either the batter or the article.

It is a further object of the invention to so design and construct the apparatus that it will have a limited number of parts, these being simple in structure and assembly, and when assembled will operate with the maximum efficiency and with the minimum attention.

To these and other ends my invention consists in the baking apparatus, having certain details of construction and combinations of parts as will be hereinafter described and more particularly pointed out in the claims.

Referring to the drawings in which like characters of reference indicate like parts in the several figures;

Figure 1 is a side elevation of my new and improved apparatus with some of the parts broken away to disclose otherwise concealed parts;

Figure 2 is a transverse elevation thereof, the parts in section being taken generally upon line 2—2 of Figure 3;

Figure 3 is a detail sectional view of one of the moulds and loading mechanism and some adjacent parts;

Figure 4 is an end view thereof;

Figure 5 is a horizontal plan view of one end of the apparatus, the parts in section being taken generally upon line 5—5 of Figure 1; and Figure 6 is a sectional view of one of the moulds and a portion of the ejecting mechanism;

In the embodiment of the invention shown herein, which is one of its several forms, 10 indicates an oven, which is substantially rectangular in cross section, supported upon a frame 14, and having inner and outer plates 11 and 12, with heat insulating material 13 therebetween.

Within the oven chamber are two substantially parallel tracks 15, which are suspended from the top of the oven by the arms 16, spaced from each other. Through both ends of the oven and in register with said brackets are the openings 17, which are closed by doors 18 that are held in their closed positions by springs 19, in a well known manner.

Journaled in the opposite ends of the frame 14 are the shafts 20, upon each of which are fixed companion sprocket wheels 21, around and between which are the sprocket chains 22. The upper portion of the sprocket chains that pass through the oven 10, ride upon tracks 15. Fixed to this chain are a plurality of moulds 23, which are of the same general form as the article to be baked.

In the drawings I have shown these moulds as shaped to produce the food article, such as the roll 69, in Figure 7, which is generally cylindrical in form, of substantially the same diameter throughout, with an opening in the center, and a slot in one side thereof. These moulds are preferably made with a shell 24, having a bottom 25 at one end, through which are a plurality of arcuate slots 26, whereby the mould may be separably secured to the chain 22 by means of the studs 27 fixed in the plates 28 forming part of each of the chain links. Within each mould is a plunger 55 having a platform 56 at one end. Connected with this plunger is a stem 57, which passes through an opening in a fixed member 58 and having a head 59 thereon. Between this head and the fixed member 58 is a spring 60, which exerts its tension so as to move and retain the platform 56 against the bottom of the mould.

Fixed in the frame 14 adjacent to one end thereof, is an apron 29, on which is journaled the shafts 30 and 31. Upon the shaft 30 is a worm gear 32 and a pinion 33, this latter meshing into a gear 34 on the shaft 31.

The motor 35 provides a convenient power source, upon the armature of which is a worm 36 that drives the worm gear 32. Any other source of power may be utilized equally as well as the motor 35 if desired.

Fixed on one of the shafts 20 is a disk 37, having a plurality of teeth 38 on the periphery thereof, there always being one of said teeth in the same radial plane as each of the moulds while passing around the sprocket wheel 21.

Secured on the shaft 31 is an arm 70, having a single tooth 39 thereon. During the rotation of this arm the tooth 39 engages one of the teeth 38 on the disk 37 and imparts a limited rotation thereto and an intermittent travel to the chains 22, and moulds 23.

Held in a fixed position relative to the oven by the bracket 40 or the like, is a hopper 41, having connected therewith the chutes 42, which open in part at their lower end just above the top of the moulds, substantially as shown in Figure 3. A plate 71 at the bottom of the chute 42 covers that portion of the end of the mould that is not to receive the batter.

Movable across the interior of the chutes 42 are the slides 43 and 44 which are supported in lugs 45 and pivotally connected at their outer ends to rock arms 46 and 47. These latter are mounted upon a pintle 48 in the bracket 49 connected with the oven 10.

Fixed on the shaft 31 is the cam 50, having grooves 51 and 52 in the opposite faces thereof, which receive the cam rolls on the rock arms 46 and 47. Rotation of the cam 50 imparts a rocking motion to the rock arms 46 and 47 in timed relation with other parts and actuates the slides 43 and 44.

A mass of batter is placed in the hopper 41, which by its own weight enters the chutes 42 and rests upon the slide 44. Thereafter, in the operation of the machine, the slide 43 is projected into the chute, separating from the mass that portion of the batter between the slides 43 and 44. As the slide 43 enters the chute, the slide 44 is withdrawn and the batter under the slide 43 drops into the mould then positioned thereunder and being in its rest position. Thereafter motion is imparted to the chain 22 and the slide 43 is withdrawn from, and slide 44 projected into, the chute. Another portion of the mass of batter fills the chute 42, resting upon the slide 44 and the operations are continued as before.

The hopper 41 has an inverted inclined bottom, the highest point 53 of which is above the chutes 42, whereby the batter is directed into each of the chutes 42.

After a mould has been loaded the movement of the chain carries it into the oven through the doors 18 and an empty mould is presented below the loading chutes. Immediately the mould has passed the doors 18, the springs 19 automatically close the same. The length of the oven is such that the moulds while traveling therethrough, with a step by step movement, are in the oven a sufficient length of time to bake the batter. The moulds pass out of the oven through the opening in the end thereof, actuating the doors 18 for that purpose, substantially as shown in Figure 5, which is closed by the springs 19.

A locking spring 54 has contact with one of the teeth of the sprocket wheels 21 to prevent any over travel thereof during the intermittent movements of the chain.

Means are provided for automatically ejecting each of the baked articles from the moulds, there being an ejecting mechanism for each of the chains. This mechanism comprises a plunger 61 movable in a bracket 62 and deriving a reciprocatory motion through the crank arm 63 connected to a bracket 64 and actuated from the cam 50 through the rod 65 having connection with the crank arm 63. This rod 65 is secured in a yoke 66 which straddles the shaft 31 and having a cam roll 67 which projects into a cam groove in the cam 50. When the chain comes to a rest position, and while being loaded, the crank arm 63 is actuated and the plunger 61 moves downwardly and engages the head 59 and moves the plunger 55 against the tension of the spring 60 and thus ejects the finished baked article from the mould into a receptacle conveniently arranged to receive it. The plunger 61 is now withdrawn, the plunger 55 returns to its former position, and the chain is again moved until an empty mould is presented to the loading mechanism, and likewise the next succeeding loaded mould is presented to the ejecting mechanism.

Any of the many forms of device for greasing the interior of the moulds may be used with this invention.

The oven may be heated by gas in the usual manner, admitted through the pipe 68, or by any other means, as may be most desirable.

In operation the batter in a mass is placed in the hopper and then enters the moulds in predetermined amounts. As the moulds pass through the oven the batter is thoroughly baked to produce the finished food article, which is finally ejected from the mould. All of these operations being entirely automatic at no time does the human hand touch the batter or article.

The mechanism by which these operations are accomplished is composed of relatively few parts that are simple in structure and will withstand rough usage, without becoming broken or disarranged.

Minor changes may be made within this invention, aside from those herein suggested, and the same is therefore not limited to the exact construction herein shown and described, but to such structures as fall fairly within the spirit and scope of the appended claims.

What I claim as new and desire to secure by Letters Patent, is:

1. In apparatus of the character described; a chain, each of the links of which is provided with a plate; studs on said plate; and a mould having arcuate slots in one end thereof which receive the heads of said studs and by reason thereof separably secure the mould to said plates.

2. In apparatus of the character described; a plurality of molds formed with an outer shell and an inner shell integral with and concentric with each other, each of the moulds being provided with a plunger within the inner shell, a platform within each mould that is fixed to one end of the plunger and extending across the open space between the inner and outer shells, a spring within the inner shell for normally holding the plunger in one of its positions, and means movable within a fixed part for ejecting an article from the mould, comprising a plunger that in timed relation with other parts will enter the inner shell and actuate the first mentioned plunger against the tension of said spring to move the platform within the mould.

3. In an apparatus of the character described; an oven; a plurality of moulds formed with an outer shell and an inner shell integral and concentric with each other; means for causing the moulds to travel through the oven with an intermittent movement; a hopper; a chute leading from the hopper to a point approximating the path of the top of the mould, the outlet end of the chute being closed over that portion thereof as is opposite the inner shell of the mould when the latter is in register with the chute; and means, as companion slides, spaced from each other and movable across the chute in timed relation with other parts, whereby the upper of the slides will cut off from the mass of batter that portion thereof as is between the two slides, and after being so cut off the lower of the two slides will permit the batter so cut off to enter the open space of the mould between the inner and outer shells.

GEORGE W. LYONS.